United States Patent
Kelly, Jr.

[11] Patent Number: 5,975,179
[45] Date of Patent: Nov. 2, 1999

[54] TIRE STITCHING APPARATUS

[76] Inventor: James E. Kelly, Jr., 1409 Misty Cir., Gilbert, S.C. 29054

[21] Appl. No.: 09/035,193

[22] Filed: Mar. 5, 1998

[51] Int. Cl.$^6$ .............................. B29D 30/28; B30B 3/00
[52] U.S. Cl. .............................. 156/421; 156/412; 492/5; 492/40
[58] Field of Search .................... 156/421, 412, 156/413, 130.3; 492/40, 42, 47, 4, 5, 27; 100/155 R

[56] References Cited

U.S. PATENT DOCUMENTS

| | | | |
|---|---|---|---|
| 1,762,850 | 6/1930 | Vrbanac | 156/421 |
| 1,834,559 | 12/1931 | Waner | 156/412 |
| 1,869,317 | 7/1932 | Stevens | 156/412 |
| 1,981,828 | 11/1934 | Shook | 156/421 |
| 2,703,131 | 3/1955 | Robbins et al. | 156/412 |
| 2,737,226 | 3/1956 | Jimerson | 156/412 |
| 3,819,449 | 6/1974 | Caretta | 156/413 |
| 3,850,719 | 11/1974 | LeBlond et al. | 156/128 R |
| 3,850,728 | 11/1974 | Takahashi | 156/358 |
| 3,944,458 | 3/1976 | Branick | 156/412 |
| 4,004,961 | 1/1977 | Takasuga et al. | 156/421 |
| 4,039,366 | 8/1977 | Yabe | 156/405 |
| 4,052,246 | 10/1977 | Albareda et al. | 156/412 |
| 4,057,455 | 11/1977 | Klose | 156/410 |
| 4,237,592 | 12/1980 | Kuge et al. | 492/42 |
| 4,276,105 | 6/1981 | Gessaga | 156/128 |
| 4,306,931 | 12/1981 | Klose | 156/413 |
| 4,341,584 | 7/1982 | Czernichowsky | 156/412 |
| 4,954,204 | 9/1990 | Grimshaw | 156/361 |
| 5,058,497 | 10/1991 | Bishop et al. | 100/155 R |
| 5,181,982 | 1/1993 | Kumagi et al. | 156/415 |
| 5,207,849 | 5/1993 | Siegenthaler | 156/130.3 |
| 5,312,502 | 5/1994 | Imai et al. | 156/130.3 |
| 5,330,609 | 7/1994 | Dreyer et al. | 156/421 |
| 5,454,897 | 10/1995 | Vaniglia | 156/166 |

Primary Examiner—Geoffrey L. Knable
Attorney, Agent, or Firm—Joseph T. Guy, Jr.

[57] ABSTRACT

The present invention describes an improved pressing roller for a tire building machine. The roller comprises a cylindrical sleeve with each end attached to a housing. Inside the sleeve, and between the housings is a spring biased to separate the housings. A multiplicity of ring shaped inner bearings circumferentially surrounding the sleeve in a parallel arrangement and a multiplicity of ring shaped outer bearings circumferentially surrounding the inner bearings in parallel arrangement. The outer bearings are rotatable relative to the inner bearings. As the roller is moved into operating proximity of the tire the spring is displaced away from the rotating axis of the roller causing the outer bearings to press on the tire and provide the pressure necessary for a stitching operation.

19 Claims, 3 Drawing Sheets

TIRE STITCHING APPARATUS

BACKGROUND OF THE INVENTION

The present invention relates to a device which is useful in building tires. Particularly, the present invention relates to an improved roller which is novel and which finds particular utility in stitching two elements of a tire together to form a layered structure.

The principle elements in the art of tire building are well known to include a stitching operation wherein an inner element, or carcass, is brought into intimate contact with an outer element, or tread. A cement is applied between the carcass and tread to adhere one to the other. Of utmost importance to this stitching operation is the application of pressure to insure an adequate bond between the carcass and tread and to eliminate any air that is entrapped between the tread and carcass. Air is usually excluded from the space by the use of pressure rollers as well known in the art. There are three main categories of pressure rollers taught in the art. These can be categorized as spiral rollers, sequential rollers and contouring rollers.

Spiral rollers typically comprise a multiplicity of wheels, or similar device, which travel around the tire in a spiral fashion beginning in the center of the tread and transiting towards the edges. Typically, a pair of wheels work in symmetrical tandem excluding air as both transit linearly towards the outer edge of the tire while the tire rotates on its axis. Exemplary examples include U.S. Pat. Nos. 5,312,502; 5,181,982; 4,341,584; 4,306,931; 4,276,105; 4,057,455; 3,850,719 and 3,850,728. Spiral roller mechanisms tend to compress and spread the tread which causes tread material to accumulate towards the edge of the tire. This is undesirable.

Sequential rollers typically comprise a multiplicity of wheels situated in pairs which are symmetrical about the center of the tread. The roller(s) closest to the center of the tread come into contact with the tread first to exclude air from between the center portion of the tread and carcass. After a suitable time a second set of rollers, displaced towards the edge, are brought into contact with the tread of the tire. Additional sets of rollers, each displaced outwardly relative to the previously contacting rollers, are brought into contact sequentially. Exemplary examples include U.S. Pat. Nos. 4,039,366; 4,004,961 and 3,819,449. The sequential rollers eliminate the problem of outward displacement of tread material but are lacking in their ability to easily conform to differing surface contours. If a change in tire style, or size is required the wheels are replace which is undesirable.

Contouring rollers, the class containing the present invention, typically comprise a multiplicity of independently moving disk around a central core. U.S. Pat. No. 4,052,246 and U.S. Pat. No. 5,330,609 are exemplary references teaching contouring rollers.

Both U.S. Pat. No. 4,052,246 and U.S. Pat. No. 5,330,609 comprise a multiplicity of parallel disk circumferentially surrounding an inflatable tube. The tube is inflated which, in turn, causes the disk to exert pressure on the surface of the tread. The amount of deflection available is limited to the size of the inflatable tube. The range of contour changes with which the existing contouring roller design can be operated is limited thereby diminishing their operating range.

SUMMARY OF THE INVENTION

It is an object of the present invention to provide an improved roller assembly for use in building tires.

An embodiment of the present invention is provided in a pressing roller for a tire building machine comprising:
 a) a first housing and a second housing;
 b) a cylindrical sleeve wherein a first side of the sleeve is attached to the first housing and a second side of the sleeve is attached to the second housing;
 c) a spring inside the sleeve and biased to separate the first housing from the second housing;
 d) a multiplicity of ring shaped inner bearings circumferentially surrounding the sleeve in a parallel arrangement;
 e) a multiplicity of ring shaped outer bearings circumferentially surrounding the inner bearings in parallel arrangement wherein the outer bearings are rotatable relative to the inner bearings.

Another embodiment of the present invention is provided in a pressing roller for a tire building machine comprising:
 a) a first housing and a second housing;
 b) a cylindrical sleeve wherein a first side of the sleeve is attached to the first housing and a second side of the sleeve is attached to the second housing;
 c) a spring inside the sleeve and biased to separate the first housing from the second housing;
 d) a multiplicity of ring shaped inner bearings circumferentially surrounding the sleeve in a parallel arrangement;
 e) a first bearing end support attached to the first housing and second bearing end support attached to the second housing wherein the first bearing end support and the second bearing end support clamp the multiplicity of ring shaped inner bearings there between;
 f) a multiplicity of ring shaped outer bearings circumferentially surrounding the inner bearings in parallel arrangement wherein the outer bearings are rotatable relative to the inner bearings.

Yet another embodiment of the present invention is provided in a pressing roller for a tire building machine comprising:
 a) a first housing and a second housing;
 b) a cylindrical sleeve wherein a first side of the sleeve is attached to the first housing and a second side of the sleeve is attached to the second housing;
 c) a spring inside the sleeve and biased to separate the first housing from the second housing;
 d) at least one first ring shaped inner bearing circumferentially surrounding the sleeve;
 e) at least one second ring shaped inner bearing circumferentially surrounding the sleeve and parallel to the first ring shaped inner bearing
 f) a ring shaped spacer disk circumferentially surrounding the sleeve wherein the spacer disk is between the first ring shaped inner bearing and the second ring shaped inner bearing;
 g) at least one first ring shaped outer bearing circumferentially surrounding the first ring shaped inner bearing wherein the first ring shaped outer bearings is rotatable relative to the first ring shaped inner bearing;
 h) at least one second ring shaped outer bearing circumferentially surrounding the second ring shaped inner bearing wherein the second ring shaped outer bearing is rotatable relative to the second ring shaped inner bearing.

DETAILED DESCRIPTION OF THE INVENTION

Throughout the following description similar elements are numbered accordingly.

Figure 1:
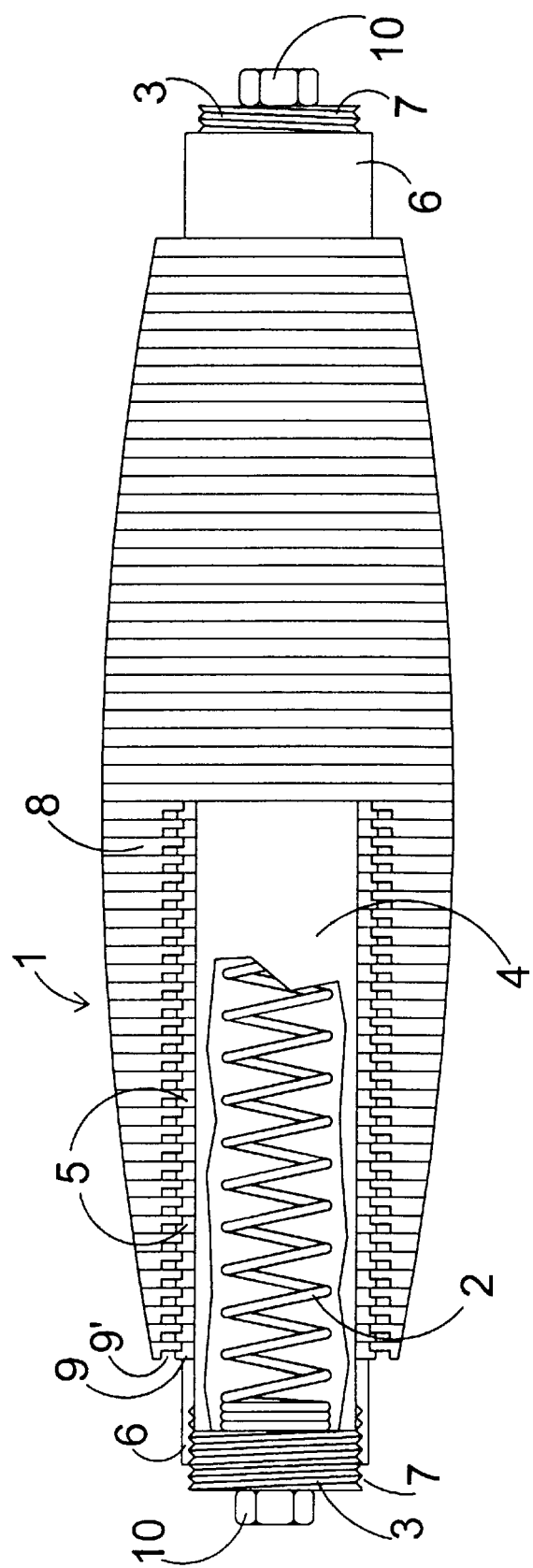
FIG. 1 is a partial cross-sectional view of an embodiment of the present invention.

Referring to FIG. 1 wherein illustrated is a roller assembly embodiment of the present invention. The roller assembly is generally represented at 1. The roller assembly comprises an interior spring, 2, between a pair of cylindrical housings, 3, and positioned to separate the pair of cylindrical housings. A cylindrical bladder sleeve, 4, encases the spring and is sealed on each end to the cylindrical housings. The seal is preferably sufficient to allow fluid, such as air, to be introduced into the bladder sleeve without leakage. The bladder sleeve is received within a multiplicity of ring inner bearings, 5, which circumferentially surround the bladder sleeve. The inner bearings, 5, are pressed together in parallel fashion by a pair of bearing end supports, 6. Each bearing end support receives a cylindrical housing, 3, and engages with the cylindrical housing to remain in a fixed position. A preferred roller comprises matching threads, 7, on the exterior of the cylindrical housing and interior of the bearing end support as an engagement means. The inner bearings, 5, are received within a multiplicity of ring shaped outer bearings, 8, which mate with the inner bearings with matching protrusions, 9, 9'. The outer bearings circumferentially surround the inner bearings and are rotatable relative to the inner bearings. A pair of attachment elements, 10, integral to the cylindrical housings, 3, are provided for mounting on a frame as is typical in the use of roller assemblies in the art. The frame is not shown.

The profile of the multiplicity of outer bearings, 8, may be tapered with those in the center having a larger circumference and those towards the end having a smaller circumference as shown in FIG. 1. In use the center of the tire will be aligned to coincide with the largest diameter outer bearing. This configuration insures that the initial contact between the outer bearings and the tire is at the center of the tire. As the tire and centerline of the roller are brought into closer proximity the smaller diameter outer bearings begin contacting the tire and any air accumulated between the tread and carcass is expelled sideways. The ring shaped outer bearings may all have the same circumference. The multiplicity of outer bearings may comprise at lea st one outer bearing with a large circumference relative to an average circumference of all the outer bearings and at least one outer bearing with a smaller circumference relative to the average circumference of all said outer bearings.

Figure 2:
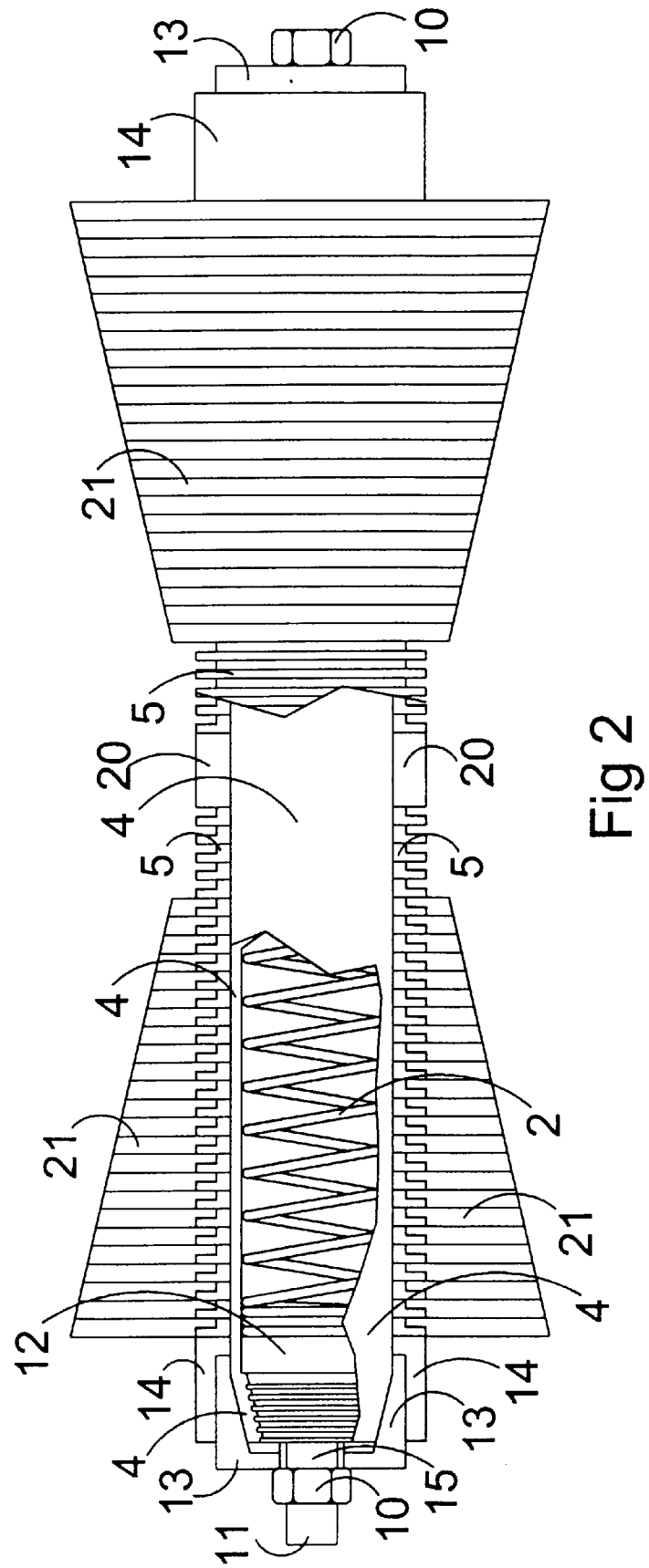
FIG. 2 is a partial cross-sectional view of another embodiment of the present invention.

FIG. 2 illustrates another embodiment of the present invention. In FIG. 2, the spring, 2, bladder sleeve, 4, and inner bearings, 5, are as illustrated in FIG. 1. The inventive roller illustrated in FIG. 2 comprises a ring shaped spacer disk, 20, preferably in the proximity of the center of the roller. A multiplicity of inner bearings circumferentially surround the bladder sleeve on either side of the spacer disk as illustrated. Outer bearings, 21, tapered such that the outer bearings towards the end have a larger circumference and the outer bearings towards the center have a smaller circumference. In contact with each end of the spring is a bell housing, 12. The bell housing, 12, preferably comprises a larger cylindrical end in contact with the spring, 2, and a conical end with ribs. The bladder sleeve, 4, encases the cylindrical end of the bell housing and the conical end. A bladder coupling, 13, presses on the bladder sleeve causing it to compress into the ribs thereby locking the bladder sleeve into place. The bladder coupling, 13, also engages with a disk collar, 14, which presses the inner bearings, 5, and optional spacer disk, 20, if present together. The bladder coupling, 13, preferably mounts onto a threaded rod, 15, which is attached to, or integral to, the bell housing, 12. A attachment elements, 10, is also attached to the threaded rod. An optional fluid inlet, 11, is provided in the attachment elements, 10, for introducing fluid, such as air, into the bladder sleeve.

Figure 3:
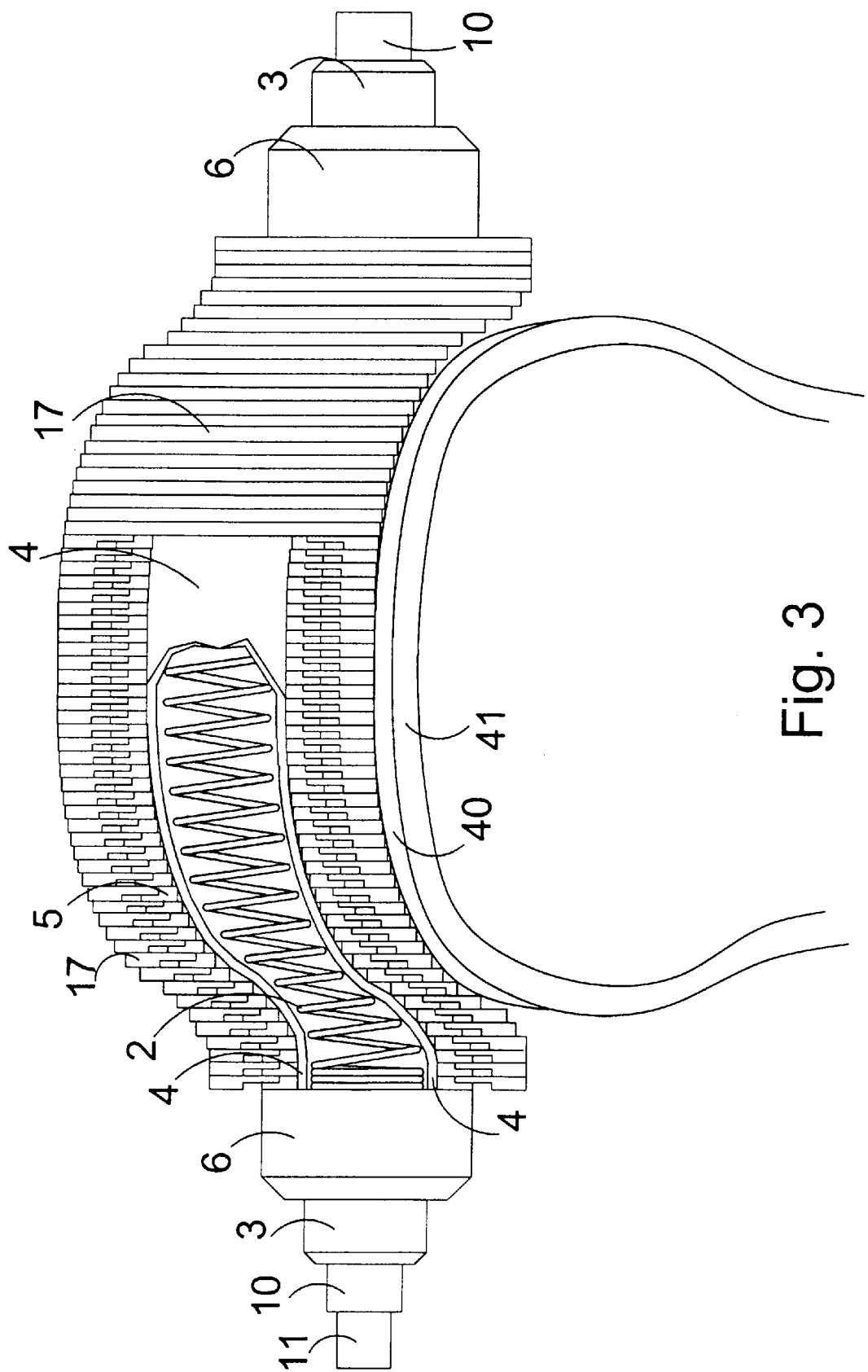
FIG. 3 is a partial cross-sectional view of yet another embodiment of the present invention in operating position relative to a tire being stitched.

FIG. 3 illustrates the inventive roller in operative association with a tire being stitched. A tread, 40, is being stitched to a carcass, 41, in accordance with the manner in which the invention would be utilized during the manufacture of a tire. In FIG. 3 the cylindrical housings, 3, bearing end support, 6, and attachment elements, 10, are as identified above. A multiplicity of outer bearings, 17, all with the same diameter across the roller are in contact with the tire. The spring, 2, and bladder sleeve, 4, are displaced away from their rest position. The tension caused by forcing the spring away from the rest position causes a pressure on the surface of the tire which causes the stitching to occur as herein described. An optional fluid inlet, 11, can be attached to, or integral to, the attachment element, 10, to allow fluid, such as air to be injected into the bladder sleeve. Injecting fluid into the bladder sleeve allows for more precise control of the deflection of the roller and is preferable for some operations.

What is claimed is:

1. A pressing roller for a tire building machine comprising:

a) a first housing and a second housing;

b) a cylindrical sleeve wherein a first side of said sleeve is attached to said first housing and a second side of said sleeve is attached to said second housing;

c) a spring inside said sleeve and biased to separate said first housing from said second housing;

d) a multiplicity of ring shaped inner bearings circumferentially surrounding said sleeve in a parallel arrangement;

e) a multiplicity of ring shaped outer bearings circumferentially surrounding said inner bearings in parallel arrangement wherein said outer bearings are rotatable relative to said inner bearings.

2. The pressing roller of claim 1 wherein each of said housings is cylindrical.

3. The pressing roller of claim 1 wherein each of said housings comprises a cylindrical portion and a conical portion.

4. The pressing roller of claim 1 wherein said multiplicity of ring shaped outer bearings all have the same circumference.

5. The pressing roller of claim 1 wherein said multiplicity of ring shaped outer bearings comprise a tapered profile.

6. The pressing roller of claim 1 wherein said multiplicity of outer bearings comprise at least one outer bearing with a large circumference relative to an average circumference of all said outer bearings and at least one outer bearing with a smaller circumference relative to said average circumference of all said outer bearings.

7. The pressing roller of claim 6 wherein said at least one outer bearing with a large circumference is centered on said roller.

8. The pressing roller of claim 1 wherein said multiplicity of ring shaped inner bearings comprises a first ring shaped inner bearing and a second ring shaped inner bearing and further comprising a ring shaped spacer disk circumferentially surrounding said sleeve wherein said spacer disk is between said first ring shaped inner bearing and said second ring shaped inner bearing.

9. The pressing roller of claim 1 further comprising a fluid inlet attached to said first housing for introducing a fluid into said cylindrical sleeve.

10. A pressing roller for a tire building machine comprising:
   a) a first housing and a second housing;
   b) a cylindrical sleeve wherein a first side of said sleeve is attached to said first housing and a second side of said sleeve is attached to said second housing;
   c) a spring inside said sleeve and biased to separate said first housing from said second housing;
   d) a multiplicity of ring shaped inner bearings circumferentially surrounding said sleeve in a parallel arrangement;
   e) a first bearing end support attached to said first housing and second bearing end support attached to said second housing wherein said first bearing end support and said second bearing end support clamp said multiplicity of ring shaped inner bearings there between;
   f) a multiplicity of ring shaped outer bearings circumferentially surrounding said inner bearings in parallel arrangement wherein said outer bearings are rotatable relative to said inner bearings.

11. The pressing roller of claim 10 wherein said multiplicity of ring shaped outer bearings all have the same circumference.

12. The pressing roller of claim 10 wherein said multiplicity of ring shaped outer bearings comprise a tapered profile.

13. The pressing roller of claim 10 wherein said multiplicity of outer bearings comprise at least one outer bearing with a large circumference relative to an average circumference of all said outer bearings and at least one outer bearing with a smaller circumference relative to said average circumference of all said outer bearings.

14. The pressing roller of claim 10 wherein said multiplicity of ring shaped inner bearings comprises a first ring shaped inner bearing and a second ring shaped inner bearing and further comprising a ring shaped spacer disk circumferentially surrounding said sleeve wherein said spacer disk is between said first ring shaped inner bearing and said second ring shaped inner bearing.

15. A pressing roller for a tire building machine comprising:
   a) a first housing and a second housing;
   b) a cylindrical sleeve wherein a first side of said sleeve is attached to said first housing and a second side of said sleeve is attached to said second housing;
   c) a spring inside said sleeve and biased to separate said first housing from said second housing;
   d) at least one first ring shaped inner bearing circumferentially surrounding said sleeve;
   e) at least one second ring shaped inner bearing circumferentially surrounding said sleeve and parallel to said first ring shaped inner bearing
   f) a ring shaped spacer disk circumferentially surrounding said sleeve wherein said spacer disk is between said first ring shaped inner bearing and said second ring shaped inner bearing;
   g) at least one first ring shaped outer bearing circumferentially surrounding said first ring shaped inner bearing wherein said first ring shaped outer bearings is rotatable relative to said first ring shaped inner bearing;
   h) at least one second ring shaped outer bearing circumferentially surrounding said second ring shaped inner bearing wherein said second ring shaped outer bearing is rotatable relative to said second ring shaped inner bearing.

16. The pressing roller of claim 15 wherein each of said housings is cylindrical.

17. The pressing roller of claim 15 wherein each of said housings comprises a cylindrical portion and a conical portion.

18. The pressing roller of claim 15 comprising a multiplicity of outer bearings wherein said multiplicity of outer bearings comprise at least one outer bearing with a large circumference relative to an average circumference of all said outer bearings and at least one outer bearing with a smaller circumference relative to said average circumference of all said outer bearings.

19. The pressing roller of claim 15 further comprising a fluid inlet attached to said first housing for introducing a fluid into said cylindrical sleeve.

* * * * *